(12) United States Patent
Haight et al.

(10) Patent No.: US 8,804,093 B2
(45) Date of Patent: Aug. 12, 2014

(54) SYSTEMS AND METHODS FOR THEATER SEAT MOVEMENT

(76) Inventors: Levoy Haight, West Jordan, UT (US); J. Ken Barton, Sandy, UT (US); David J. Havell, Salt Lake City, UT (US); Aaron Michael Best, Murray, UT (US); Trent Lawrence Rolf, South Jordan, UT (US); Mark Myers, Riverdale, UT (US)

( * ) Notice: Subject to any disclaimer, the term of this patent is extended or adjusted under 35 U.S.C. 154(b) by 226 days.

(21) Appl. No.: 13/282,429

(22) Filed: Oct. 26, 2011

(65) Prior Publication Data

US 2013/0107216 A1    May 2, 2013

(51) Int. Cl.
*A47C 7/00* (2006.01)
*A47C 7/56* (2006.01)
*G03B 31/00* (2006.01)

(52) U.S. Cl.
USPC ..... 352/3; 352/5; 352/40; 352/85; 297/217.4; 381/151

(58) Field of Classification Search
USPC ............ 352/1, 3, 5, 40, 85; 297/217.4, 217.3; 381/98, 151, 152, 301, 333
See application file for complete search history.

(56) References Cited

U.S. PATENT DOCUMENTS

| | | | |
|---|---|---|---|
| 7,918,308 B2 * | 4/2011 | Cohen | 181/150 |
| 2004/0021351 A1 * | 2/2004 | House | 297/217.4 |
| 2010/0205867 A1 * | 8/2010 | Park | 52/8 |
| 2010/0320819 A1 * | 12/2010 | Cohen et al. | 297/217.4 |

* cited by examiner

*Primary Examiner* — William C Dowling
(74) *Attorney, Agent, or Firm* — Michael F. Krieger; Kirton McConkie

(57) ABSTRACT

Systems and methods for providing movement to seating including theater seating generate complex motion responses in the seating by automatically analyzing an audio component of media being consumed for one or more aspects of the audio information contained in the audio component at certain frequencies or frequency ranges. The aspects analyzed include aspects relating to frequencies and frequency ranges substantially higher than the low-frequency signals used to drive motion of theater seating. From the analysis of the audio aspects contained in the audio component, a plurality of independent low-frequency output signals is generated. The plurality of independent low-frequency output signals is directed to a plurality of individual actuators incorporated into different locations in a seat to provide sensations of motion at different locations of the seat, such as at a seat location, at a lower back location, and at an upper back location.

25 Claims, 9 Drawing Sheets

SYSTEMS AND METHODS FOR THEATER SEAT MOVEMENT

BACKGROUND OF THE INVENTION

1. Field of the Invention

The present invention relates to theater seating, and more particularly to theater seating incorporating movement related to media.

2. Background and Related Art

One way in which the passive entertainment industry has been enhanced has been through the incorporation of motion into the entertainment, most particularly with respect to viewing movies. The manners in which movement has been incorporated have varied, but have tended to be complex. For example, in the theme park industry, movement may be provided by providing seating in a mock-up of a vehicle. Participants enter the mock-up and then view an audiovisual presentation. During the presentation, the entire mock-up is subjected to small and large-scale movement, such as with a hydraulic system, thereby simulating what might be experienced in an actual vehicle (often in a dangerous situation). While such systems are entertaining, they are typically not cost effective enough to spread much outside of the theme park setting.

In the movie theater setting, similar principles can be achieved with seating mounted on moveable platforms. Alternatively, hydraulic or other actuators can be provided individually to each seat. While such systems are still expensive, the range of motion of such systems is typically smaller and easier to implement, and the motion provided can greatly enhance theatergoers' experience while watching the movies. One significant problem with such systems is that they must be specially programmed to respond to each movie for which motion is desired, which is a time-consuming process. Additionally, the person programming the movement must guess the motions that will be pleasing to the moviegoers, even though personal preferences vary from person to person, even to the extent that certain moviegoers may not want any motion at all but may be unable to select movement-free seats in an all-motion theater.

Not only must the movement be specifically programmed for each feature, but the programmed movement must be carefully synchronized with the movie or the movement will detract from the experience rather than adding to it. Therefore, many systems rely on programming that is performed by the movie studio and is thus part of, for example, the movie reel. The advent of all-digital movie projection systems may reduce the synchronization concern somewhat, but the fact remains that given the expense and difficulty of programming each movie, such programming is performed for relatively few movies. Therefore, the expensive motion features incorporated into the theater seating often go unused.

Attempts have been made to avoid the programming issue using systems that provide motion to a theater seat based on bass components of a movie's soundtrack. Such systems have been found advantageous in that they are able to provide movement to essentially any movie without requiring that special programming be performed to generate the motion. Such systems, however, have significant disadvantages. For example, the systems are typically only able to provide motion in response to low-frequency sounds: motion may be felt in response to low-frequency sounds where it may be desirable to have no motion (such as low-frequency voices), and motion may be missing at times where motion is desirable even though no low-frequency sounds are present. Finally, the low-frequency noise commonly generated from such systems as part of the motion generation can detract from the normal movie audio experience.

BRIEF SUMMARY OF THE INVENTION

Systems and methods for providing movement to seating including theater seating in accordance with some embodiments of the invention address many of the disadvantages of prior motion systems. The systems and methods generate complex motion responses in the seating by automatically analyzing an audio component of media being consumed for one or more aspects of the audio information contained in the audio component at certain frequencies or frequency ranges. The aspects analyzed include aspects relating to frequencies and frequency ranges substantially higher than low-frequency sounds previously used to drive motion of theater seating. From the analysis of the audio aspects contained in the audio component, a plurality of independent low-frequency output signals is generated. For example if three low-frequency output signals are generated, a first low-frequency output signal may correspond to lower-frequency aspects of the audio component, a second low-frequency output signal may correspond to mid-frequency aspects of the audio component, and a third low-frequency output signal may correspond to higher-frequency aspects of the audio component. The output signals may be analog or digital.

Each of the low-frequency output signals is directed to a different motion-generating assembly of a seat such as a theater seat. Each of the motion-generating assemblies is located at a different location of the seat such that as motion is commanded and driven by each of the output signals, different motions and vibrations are felt at different locations of the seat. This tactile variability enhances the motion experience over existing motion systems that rely on a single actuator responding simply to a sub-bass or low-bass component of an audio track. Indeed, some embodiments of the invention provide localized motion based on lower-frequency, mid-frequency, and higher-frequency aspects of an audio component of media being consumed. For example, in some embodiments, movement is felt in a seat portion in response to but not identical with lower-frequency sounds contained in the audio component, movement is felt in a lower back portion in response to but not identical with mid-frequency sounds contained in the audio component, and movement is felt in an upper back portion in response to but not identical with higher-frequency sounds contained in the audio component.

The generated output signals and the corresponding movement may be highly customizable to respond to varying aspects of the sound information from the audio component. The system may also be highly scalable to permit control of movement of any number of seats from a single seat to as many seats may be desired.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Figure 1:
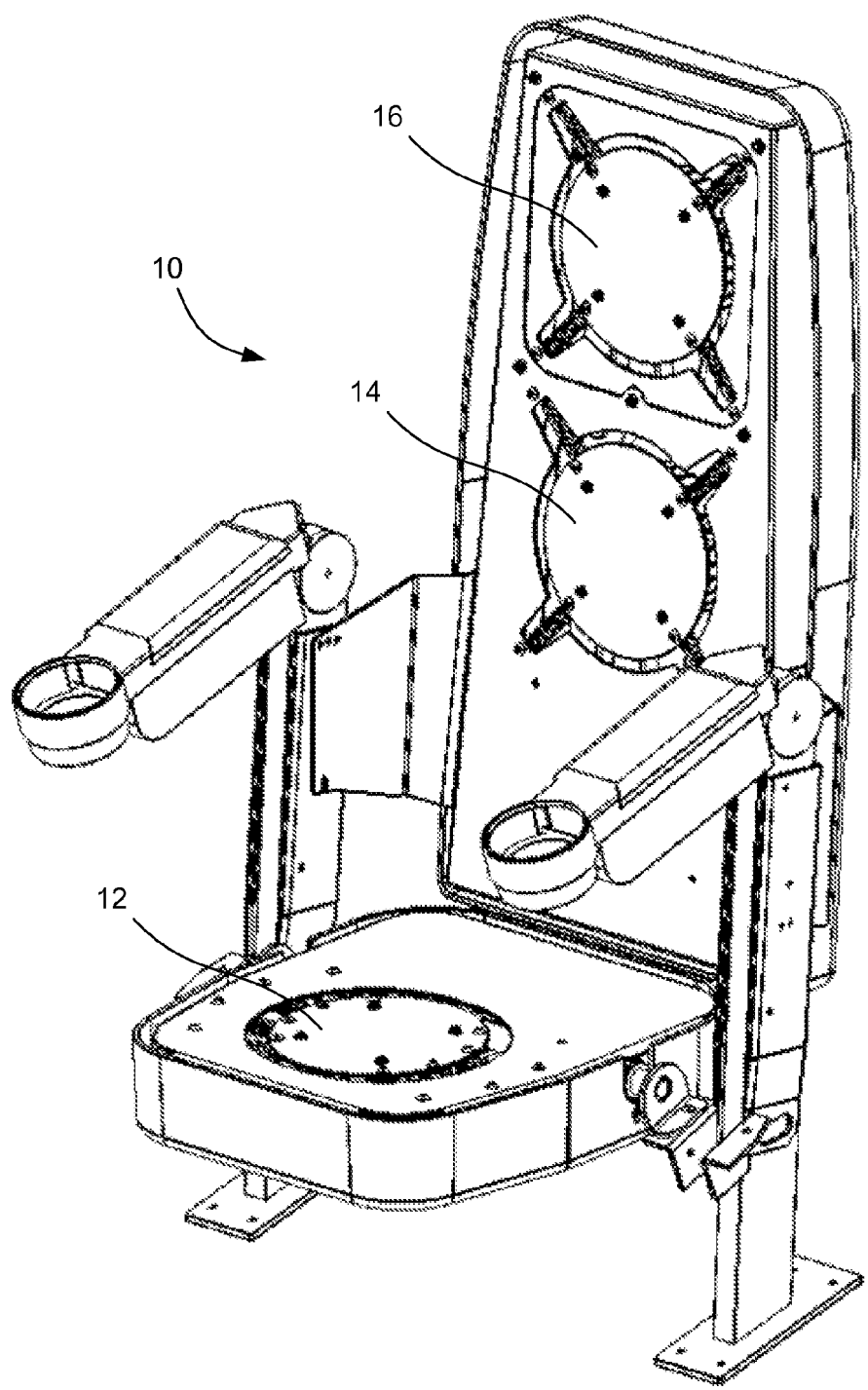
FIG. 1 shows a perspective view of a representative theater seat with padding and upholstery omitted.

FIG. 1 shows a perspective view of a representative theater seat 10 in accordance with certain embodiments of the invention. In the view shown in FIG. 1, padding and upholstery that would normally be present on the theater seat 10 during use have been omitted to facilitate understanding of the mechanisms used in this theater seat 10 to generate motion or any output simulating motion. For example, output simulating motion may include any or all of tactile output, electrical stimulation such as via current or voltage, temperature changes, or any other applicable output. Additionally, various combinations of actual motion and output simulating motion may be utilized with certain embodiments of the invention. Motion generating assemblies provide the motion or output simulating motion.

Where many low-end systems for generating motion in a seat utilize a single motion generating apparatus, it may be seen from FIG. 1 that the theater seat 10 includes three motion-generating assemblies: a seat motion assembly 12, a lower back motion assembly 14, and an upper back motion assembly 16. The use of multiple motion-generating assemblies permits the generation of different motion sensations for the user without the use of complex and expensive systems, such as hydraulic systems, that generate motion of the entire seat including any seat frame. While the illustrated embodiment utilizes three motion-generating assemblies, other embodiments utilize as few as two motion-generating assemblies (or one of the assemblies shown in FIG. 1 may optionally be unused as will be discussed later) to as many as significantly greater numbers of assemblies, such as twelve assemblies. Thus, the specific number of assemblies shown in FIG. 1 should be understood to be merely illustrative.

The use of multiple motion-generating assemblies in a manner similar to that shown in FIG. 1 allows the theater seat 10 to be used in the generation of motion in automated, complex ways not currently available. Specifically, the theater seat 10 may be used to generate motion or any other output simulating motion to enhance the occupant's media-viewing experience, where the motion or any other output simulating motion is generated automatically in response to audio information associated with the media, but not solely as a direct correlation to the media's base audio information. That is to say that the motion-generation assemblies need not be simply driven by the lower frequencies of a movie's soundtrack, but can instead be intelligently driven to correspond to sound events in any media's audio information at any desired frequency.

Figure 2:
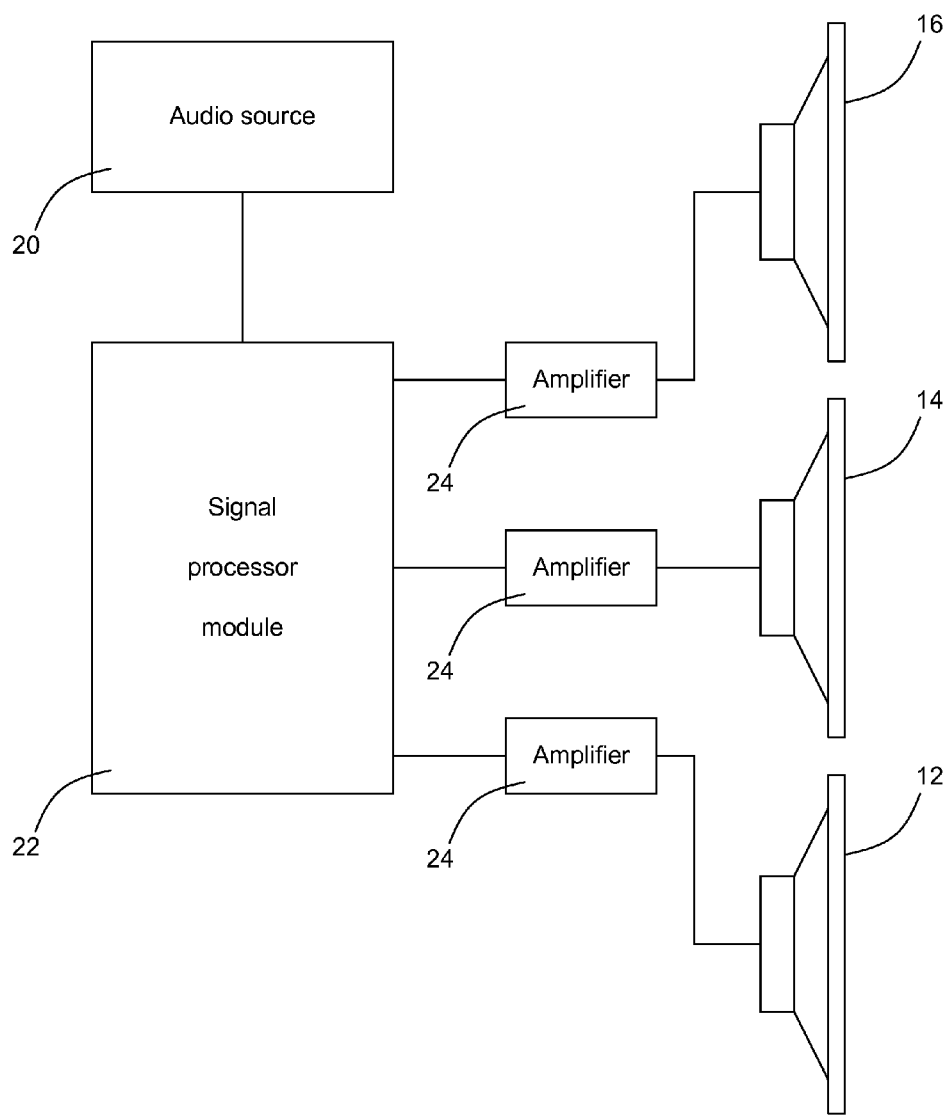
FIG. 2 shows a schematic view of components of a representative theater seat system.

To facilitate and drive this type of complex motion generation, the theater seat 10, and more specifically the various motion-generation assemblies, is connected to a signal processing system that evaluates input audio signals, whether digital or analog, and outputs driving signals to the motion-generation assemblies based on but typically not identical to the input audio signals. FIG. 2 schematically illustrates a representative system configuration for taking information from an audio source 20 and using the information to intelligently drive the various motion-generating assemblies.

In FIG. 2, the audio source 20 may be any source of audio, including full-spectrum audio sources and reduced-spectrum audio sources. Thus the audio source 20 may provide audio information in any range of frequencies, including ranges of frequencies exceeding what is typically listed as the normal range of hearing of twenty hertz to twenty kilohertz and ranges of frequencies covering all or only a portion of this range of frequencies. The audio source 20 may also provide information in a range of frequencies that exceeds the normal hearing range of frequencies on only one end of the audio spectrum, for example on the base end of the spectrum, whether or not the range of frequencies provided by the audio source 20 extends to the other end of the normal hearing range of frequencies.

The audio source 20 may provide audio information in any of the variety of digital and analog fashions now known in the art or later invented. The audio information may be provided in a single audio channel or in any of the variety of multi-channel schemes now in use or later invented, such as simple stereo, 5.1, 7.1, etc. The audio source 20 may provide audio information through a direct connection over wires, cables and/or fiber optics, or it may provide audio information wirelessly, using any of a variety of electromagnetic signals. The audio information may correspond to any type of media having an audio component, including stand-alone audio tracks such as music tracks, audio from an audio-visual work such as a movie or television show, audio components of interactive media such as video games, and the like.

The audio source 20 provides the audio information to a signal processor module 22. The audio source 20 and the signal processor module 22 are communicatively coupled such that the audio information from the audio source 20 is received by the signal processor module 22. The communicative coupling may be by way of a hard connection (e.g. over wires, cables, or fiber optics), a wireless connection, or any other connection now known or later invented that permits the signal processor module 22 to receive the audio information from the audio source 20. The signal processor module 22 and the audio source 20 may form components of a single device or may be independent devices. The signal processor module 22 may be integrated with other components of an audio system, such as components driving speakers or the like, or may be independent of other audio system components.

The signal processor module 22 receives the audio information from the audio source, processes the audio information as will be discussed in more detail below, and outputs signals configured to cause motion generation or any other output simulating motion at the motion-generating assemblies. The signals output by the signal processor module 22 may be output via wired, fiber optic, or wireless connections, as desired for a particular application. In most embodiments, the signals output by the signal processor module 22 lack sufficient power to drive desired motion or any other output simulating motion at the motion-generating assemblies. Therefore, the signals output by the signal processor module 22 are generally received by amplifiers 24 that are electrically connected to the motion-generating assemblies. Each motion-generating assembly has its own amplifier 24 and receives its own driving signal from the signal processor module 22 such that the various motion-generating assemblies are driven independently from each other. Thus, each motion-generating assembly can be driven independently of whether or how any of the other motion-generating assemblies are being driven or otherwise caused to move.

In some embodiments, the various amplifiers 24 may be integrated with the signal processor module 22 such that the signal processor module 22 may be viewed as outputting signals of sufficient power to drive desired motion or any other output simulating motion at the various motion-generating assemblies. In other embodiments, the various amplifiers 24 may be integrated with the motion-generating assemblies such that the signal processor module 22 may similarly be viewed as outputting signals of sufficient power to drive desired motion or any other output simulating motion at the various motion-generating assemblies. In still other embodiments, the various amplifiers 24 are independent of either the signal processor module 22 or the various motion-generating assemblies.

In any event, the signal processor module 22 outputs a sufficient number of independent signals to independently drive different motion-generating assemblies or different sets of motion-generating assemblies when sets of motion-generating assemblies are driven together. Thus, returning to the exemplary theater seat 10 of FIG. 1, the specific signal processor module 22 of FIG. 2 outputs three independent output signals, one intended to drive the seat motion assembly 12, one intended to drive the lower back motion assembly 14, and one intended to drive the upper back motion assembly 16. As the signals output by the signal processor module 22 are independent of one another, the upper back motion assembly 16 can be active and driven to a different type and amplitude of motion than is simultaneously driven to the lower back motion assembly 14 while the seat motion assembly 12 is not being driven. Essentially any combination of synchronized and/or disconnected motion or any other output simulating motion can be achieved at each of the motion-generating assemblies. Additionally, one or more of the motion-generating assemblies can readily be turned off as desired, as will be discussed in more detail below.

Because the individual motion-generating assemblies can be driven independently, the signal processor module 22 can be used to generate complex motion-generating responses at the theater seat 10. While such motion-generating responses at the theater seat can optionally be limited to or may include motion directly corresponding to bass frequencies of the input audio information according to now-current practice, the signal processor module 22 can generate complex motion-generating responses that are significantly different than what is currently available. In at least some embodiments, the responses generated by the signal processor module 22 can be customized according to users' preferences, and may even be modified from time to time according to changing preferences and/or changing users.

To facilitate such customized responses, the signal processor module 22 is able to analyze and respond to a variety of audio events contained within the audio information received from the audio source 20. Thus, the abilities of the signal processor module 22 are chosen to provide any desirable characteristics and functions in accordance with a range of anticipated desired responses. While the signal processor module 22 may include a variety of components, inputs and outputs, and controls to provide a desired functionality, one illustrative signal processor module 22 is schematically shown in more detail in FIG. 3.

Figure 3:
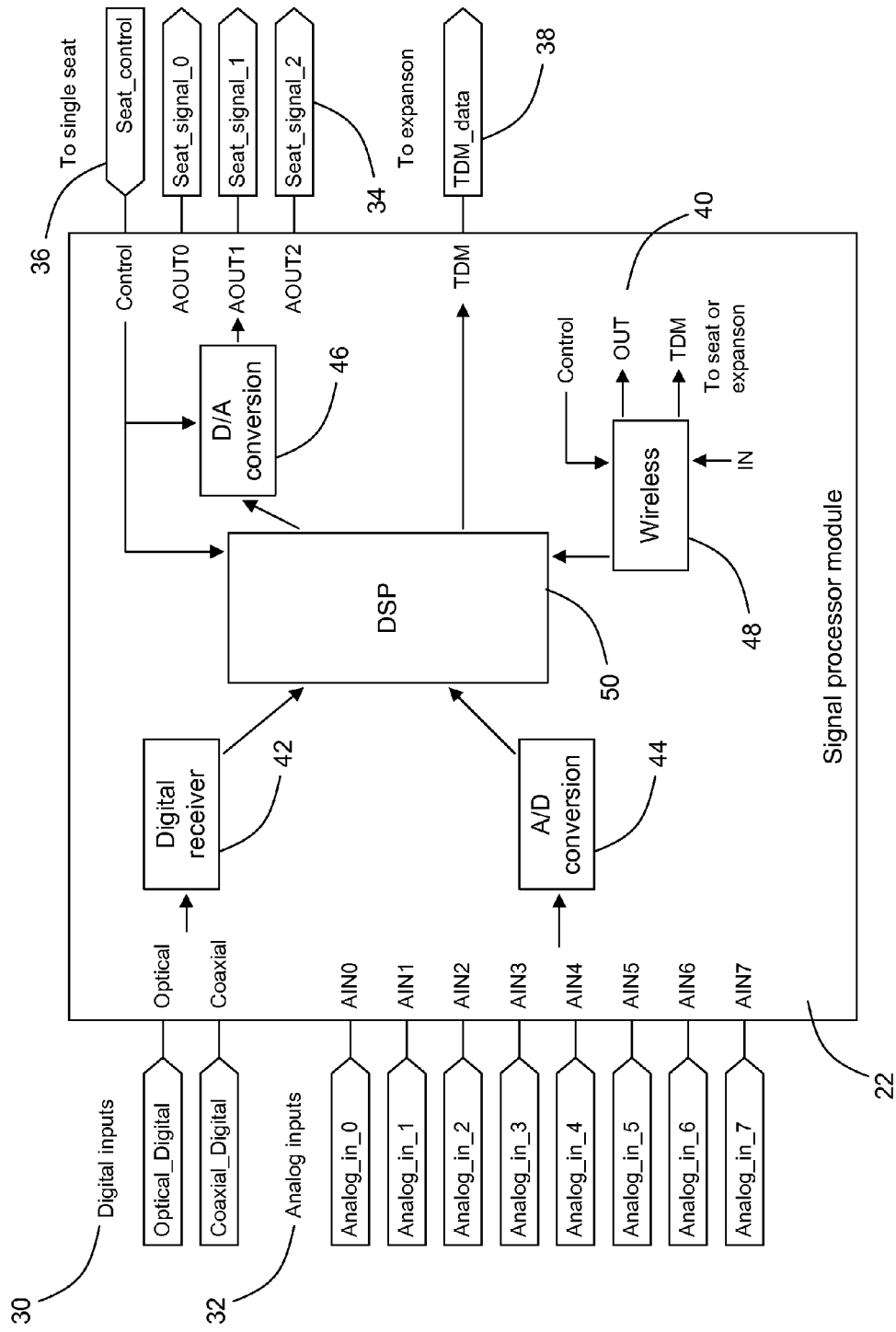
FIG. 3 shows a schematic view of a representative signal processor module in accordance with some embodiments of the invention.

As may be seen in FIG. 3, the signal processor module 22 includes a variety of inputs and outputs, and several internal components providing signal analysis and generation functionality as discussed herein. The illustrated inputs, outputs, and components are intended to be illustrative of concepts associated with the signal processor module 22, and are not intended to be restrictive. The signal processor module 22 includes one or more digital inputs 30, such as a digital optical input and a coaxial digital input, as well as one or more analog inputs 32. The inclusion of multiple types of inputs permits the signal processor module 22 to be flexibly used in a variety of system configurations; not all inputs need to be used in all implementations of the signal processor module 22. This embodiment of the signal processor module 22 also includes three analog outputs 34 to provide analog signals to the seat motion assembly 12, the lower back motion assembly 14, and the upper back motion assembly 16.

The signal processor module 22 also includes a seat control input 36 permitting the signal processor module 22 to receive a control signal back from an attached theater seat 10 to control at least some aspect, such as amplitude, of the motion-generating signals being sent to the theater seat 10. The signal processor module 22 further includes a time division multiplex (TDM) output 38 that outputs time-domain signals that can be used by an expansion or daughter module (discussed later) to provide motion-generating signals to one or more additional theater seats 10. A wireless output and/or input 40 is also included in the signal processor module 22 to permit wireless communications of input and output signals. Other embodiments of the signal processing module 22 may have more or fewer inputs and outputs, including input or output formats not specifically illustrated in FIG. 3, such as high-definition multimedia interface (HDMI) inputs and the like.

Although certain inputs and outputs have been illustrated in the Figures, it should be understood that the illustrated inputs and outputs are intended to be illustrative only and not restrictive. For example, the inputs and outputs may include inputs and/or outputs to permit the use of feedback loops and feed forward loops as an input to the system. Thus, for example, a feedback or feed forward loop may be provided with various effects provided by functions such as gain functions, derivative functions, integral functions and the like, or any combination or modification thereof. Such functions may be selectively applied to the input and/or output amplitude(s) and frequency range(s). While such functions may be provided in association with external inputs and outputs, they may also be provided by way of internally provided inputs, outputs, and functions.

Communicating between the various inputs and outputs of the illustrated signal processor module 22 are several components: a digital receiver 42, an analog-to-digital (A/D) conversion unit 44, a digital-to-analog (D/A) conversion unit 46, a wireless controller 48 and a digital signal processor (DSP) 50. The digital receiver 42 and the A/D conversion unit 44 provide signals from the digital inputs 30 and the analog inputs 32 to the DSP 50 in a format understandable by the DSP 50. The D/A conversion unit 46 converts signals from the DSP 50 into analog signals for output by the analog outputs 34 to drive the various motion-generating assemblies. The wireless controller 48 provides wireless communication between the DSP 50 and any external devices connected to the signal processor module 22 wirelessly.

The DSP 50 of the embodiment of FIG. 3 includes a combination of hardware and software that permits it to receive, buffer, interpret, analyze, and output multichannel audio signals. Any of a variety of DSPs may be chosen in varying embodiments of the invention according to the specific needs of the particular embodiments, and it is anticipated that one of skill in the art of audio processing will readily be able to select a DSP of sufficient capability to serve as the DSP 50 for a desired application in accordance with embodiments of the invention. By way of example only, one DSP that has been found to provide sufficient capability for the functions discussed herein is manufactured by Texas Instruments of Dallas, Tex. as the TI C674x family of DSPs. This DSP includes a multichannel audio serial port (McASP) hardware module for input/output and an enhanced direct memory access (EDMA) module to buffer audio data.

In the illustrative embodiment, the DSP 50 accepts a TDM serial stream with eight slots on a single channel. The A/D conversion unit can output 24-bit TDM samples at 44.1 kHz, and the EDMA module within the DSP 50 reads the McASP and buffers a block of samples for processing. Once a block of samples are ready for processing, the samples are processed according to any of a variety of considerations and signals are constructed by the DSP to drive the motion-generating assemblies. The DSP 50 then outputs a 24-bit TDM serial stream with three slots on one channel to the D/A conversion unit 46 at 44.1 kHz. The TDM serial stream may also be output directly to the TDM output 38 for use by one or more expansion or daughter modules to drive additional theater seats 10.

Figure 4:
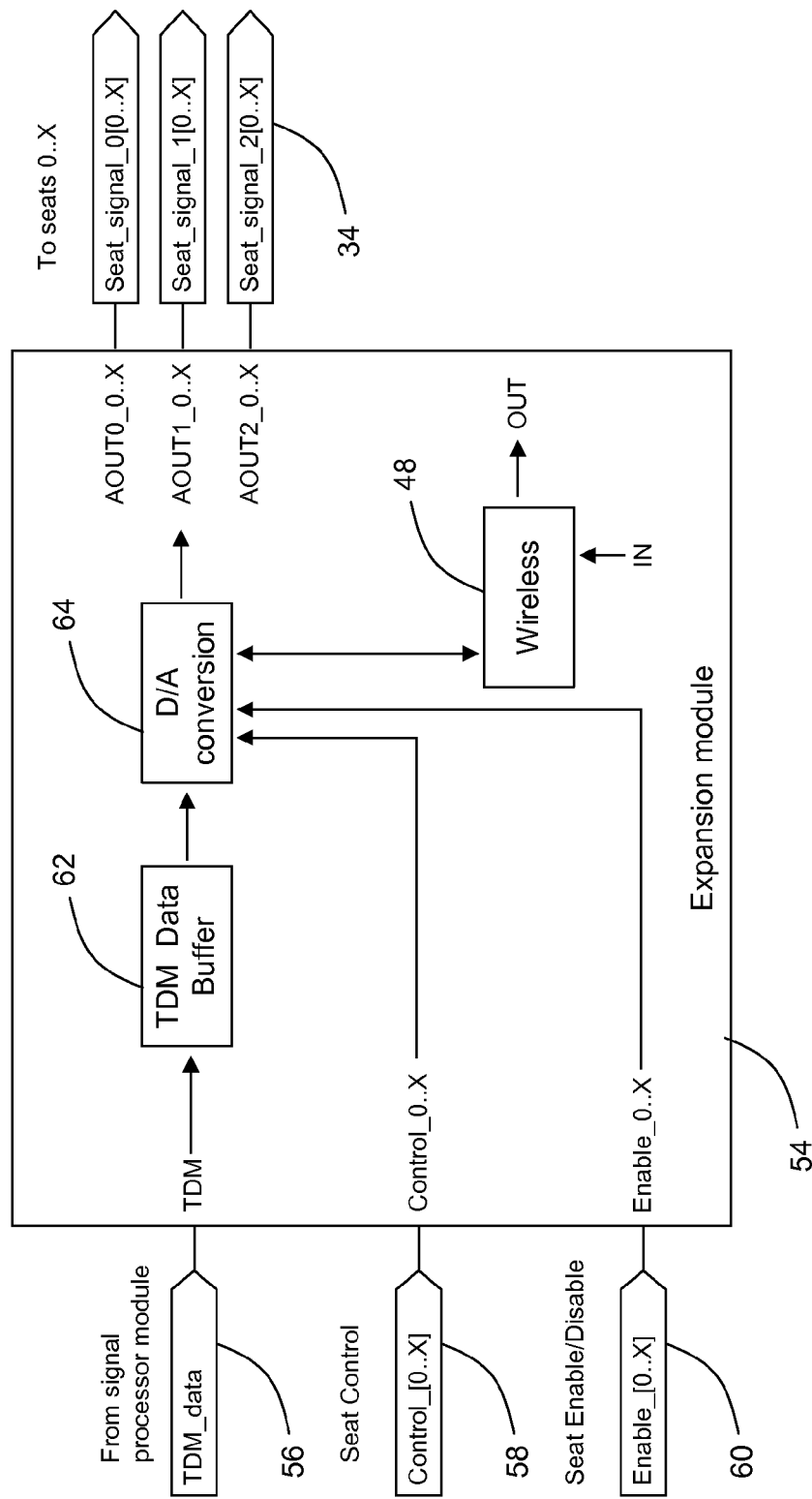
FIG. 4 shows a schematic view of a representative expansion module in accordance with some embodiments of the invention.

FIG. 4 shows an example of an expansion or daughter module (expansion module 54). The expansion module 54, while illustrated as a separate component, may optionally be included with the signal processor module 22, such as within a single enclosure. In one such embodiment, the signal processor module 22 and the expansion module 54 are combined within a single rack-mount housing. In another type of embodiment, the signal processor module 22 has a housing designed as a rack-mount unit while the expansion module 54 has a separate housing designed as a rack-mount unit. Thus, the signal processor module 22 and the expansion module 54 may form a single unit or may be separated as desired. Additionally, while a single expansion module 54 is shown in FIG. 4, the expansion module 54 may be scaled as desired by providing additional inputs and outputs or by providing additional expansion modules 54 as needed. Thus, the expansion module or modules 54 may be utilized to scale control of motion-enabled theater seats 10 to essentially any size application from an in-home theater having one or a few theater seats 10 to a large movie theater having hundreds of theater seats 10 or more.

The expansion module 54 includes a TDM input 56 to receive TDM data from the signal processor module 22. The expansion module 54 also optionally includes one or more seat control inputs 58 and/or seat enable/disable inputs 60. Where present, the seat control inputs 58 and the seat enable/disable inputs 60 permit the control (e.g. amplitude control) and enabling or disabling of the motion functions of individual theater seats 10 and/or groups of theater seats 10. The expansion module 54 also includes one or more sets of analog outputs 34 essentially similar to the analog outputs 34 discussed with respect to the signal processor module 22 and FIG. 3. The individual sets of analog outputs 34 are connected to the various theater seats 10 in a fashion analogous to the connection shown in FIG. 2. A wireless controller 48 may be included to further expand the input and/or output capabilities of the expansion module 54.

The expansion module 54 includes a TDM data buffer 62 and one or more D/A conversion units 64. The TDM data buffer 62 accepts the TDM data from the signal processor module 22 received at the TDM input 56. The TDM buffer 62 buffers the signal and may duplicate it to provide data for as many individual theater seats 10 as are controlled by the expansion module 54. The TDM signals are fed to the one or more D/A conversion units 64 to provide the analog signals for the theater seats 10. In these fashions, the expansion module 54 may not only distribute controlling signals to multiple theater seats 10, but may also serve to accept seat feedback controls and/or enable/disable signals. Thus, for example, if a moviegoer wishes not to have motion functionality or does not wish to pay a requested premium to obtain motion at his or her seat, the feedback controls and/or enable/disable signals may be used to deactivate motion at that moviegoer's theater seat 10.

In at least some embodiments, a user input device may communicate with the system to control the user's experience. The input device may be used to activate, deactivate, and/or modify the user's experience either before use of the theater seat or during use of the theater seat. The input device therefore provides one mechanism for providing seat feedback controls and/or enable/disable signals. The input device may be continuously or intermittently connected to the system, and may be connected to the system by way of a wired connection or wirelessly. For example, a hard-wired input device may be provided, such as in a portion of the theater seat. Alternatively, the user may be provided with a wireless input device, or may use any of a variety of existing devices in the possession of the user (such as a smart phone, tablet computer, etc.) to control the user's experience in real time. An operator of a theater may provide, for example a downloadable application that permits a theatergoer to input his or her seat location and control his or her motion experience from his or her smart phone.

While FIGS. 3 and 4 schematically illustrate hardware for controlling theater seat motion or any other output simulating motion at one or more theater seats 10 each having multiple motion-generating assemblies, it is important to understand various ways in which analog signals driving the various motion-generating assemblies are obtained or generated from the input audio information by the DSP 50. As mentioned previously, such signals are typically not obtained by simply passing a bass component of the input audio information to the motion-generating assemblies, as such content is may induce motion where it is not desired, may fail to induce motion where it is desired, and may cause audible audio to be heard from components that should be focused on inducing motion or any other output simulating motion. Instead, the input audio information is analyzed and processed to generate new signals to independently drive each of the motion-generating assemblies. The following discussion will illustrate these principles with respect to theater seats 10 incorporating three motion-generating assemblies as illustrated in FIGS. 1 and 2, but the principles discussed may be extended to theater seats 10 incorporating more or fewer motion-generating assemblies.

In certain embodiments of the invention, the input audio information is analyzed and the new analog driving signals created based on audio information in different ranges of frequencies. Thus, the net result in some embodiments is that the seat motion assembly 12 may exclusively or primarily respond to low-frequency audio content in the input audio information, the lower back motion assembly 14 may exclusively or primarily respond to mid-frequency audio content in the input audio information, and the upper back motion assembly 16 may exclusively or primarily respond to high-frequency audio content in the input audio information. In other embodiments, the various motion-generating assemblies may be caused to move in different orders (e.g. the seat motion assembly 12 may respond to high-frequency or mid-frequency audio content while the lower back motion assembly 14 responds to another frequency range of the audio content, etc.). The response of each motion assembly may be dynamically varied according to the changing ranges of audio content in the input audio. Additionally, while in some embodiments the ranges of frequencies in the input audio to which each motion assembly responds may be exclusive, in other embodiments, the ranges of frequencies may overlap to a desired extent.

The input audio content that generates a motion response or any other output simulating motion can vary from embodiment to embodiment, and may be a matter of personal taste to some extent. Therefore, the programming that may be utilized to cause motion responses can vary from implementation to implementation, and the following discussion is intended to provide representative examples only.

In some embodiments, whether motion-generating output signals are generated and the amplitude of any generated output signals may vary according to the average power of a given frequency range, and the output frequency or frequencies can modulate according to the input frequency signature. Thus, when a block of samples is ready for processing, a fast Fourier transform (FFT) may be performed on the block for each channel to convert it to the frequency domain. The software is then able to compute the average power for each frequency range of interest and scale one or more sine wave outputs or other waveform outputs accordingly.

The software may maintain a dynamic threshold spectral power value which the incoming audio signal must exceed to activate motion at one of the motion-generating assemblies. Because the threshold may be dynamic, motion at the theater seats may sometimes be activated at certain power values while not being activated at similar or even greater power values at other times based on the power values (e.g. loudness) of the input audio prior to the time at issue. Thus, motion may be activated in this example only for sounds that exceed surrounding sounds by a given amount. In some embodiments, the given amount necessary to trigger motion may be varied so as to increase or decrease the amount of time during which motion is generated, such as according to user preferences.

A process may also be implemented in certain embodiments to identify an optimal frequency spectrum of waves to be sent to the motion-generating assemblies. The software can also take into account input from each of the input audio channels. Thus, if a channel typically carries the main dialog, the audio information from that channel may be devalued or suppressed to minimize the effect of dialog content on resulting motion at the theater seat 10.

In some embodiments, triggering of motion or any other output simulating motion for each motion-generating assembly and the amount of motion or any other output simulating motion triggered can vary based on other characteristics of the input audio information, including at different frequencies for different motion-generating assemblies. Non-limiting examples of characteristics of the input sound that may be utilized include rates of attack at certain frequencies, rates of volume change at certain frequencies, narrowness or breadth of frequencies present in certain frequency ranges, volume at certain frequencies, change in volume at certain frequencies, volume at certain frequency ranges, change in volume at certain frequency ranges, comparisons in volume between differing frequency ranges, and the like.

While any of the foregoing characteristics of the input sounds may be used to trigger motion or any other output simulating motion and to control the amplitude of motion at the various motion-generating assemblies based solely on the characteristics of the input audio information, some embodiments utilize not only the characteristics of the input audio information but characteristics of audio information from stored audio sources to intelligently determine when to generate motion or any other output simulating motion. For example, audio information from a wide variety of sources may be analyzed automatically and/or including manual review to determine events that should generally trigger motion. As an example, the sounds of a gunshot or of clashing of swords are fairly distinctive and are often similar from instance to instance. Thus, audio information from various media sources including such sounds will often be similar enough that such sounds can be detected in a reliable-enough way that motion can be triggered regardless of whether the input audio information otherwise includes characteristics to trigger motion. Thus, some embodiments of the invention embrace the use of stored information, including libraries of stored information, regarding certain characteristics of audio information that is used to automatically trigger motion of one or more of the motion-generating assemblies.

The foregoing examples are merely a subset of the possible input audio characteristics that may be used alone or in conjunction with stored audio characteristics to trigger motion or any other output simulating motion and control the amplitude of the triggered motion or any other output simulating motion. As may be appreciated, triggering and controlling motion in manners such as these may be entirely automatic and may be triggered for any media without requiring programming specific to any input audio information. In the event that stored information is utilized for triggering/amplitude functions, the stored information is programmed not to be media-specific, but instead to be audio-characteristic specific such that it can be reliably used for any media and audio information source.

Additionally, triggering and controlling motion may be modified dynamically during the course of use. For example, movies may include periods of high audio activity and periods of low audio activity. It may be desirable to provide at least some motion effects during most or all periods of the movies. Therefore, the system may dynamically and in real time modify the triggering and controlling of motion. For example, the triggering, amplitude, and frequency ranges of motion may be modified over time as the input audio characteristics of a particular movie change, such that an audio event that would not trigger motion at one point in a movie triggers motion at another point in the movie.

While the foregoing discussion relates to triggering and amplitude of motion or any other output simulating motion based on the audio information, these are not the only characteristics of the motion that can be controlled based on automatically-detected characteristics of the input audio information. Other characteristics of the output analog motion signals that can be controlled based on characteristics of the input audio information and/or user preferences include the frequencies of output, the combination of frequencies of output, and the relative magnitudes of the various frequencies of output. For example, the feel of motion generated based on a pure sine wave at a certain frequency and amplitude may be very different from the feel of motion generated based on that same sine wave at the same frequency and amplitude but combined with harmonic or non-harmonic frequencies at various different amplitudes. Some combinations may result in a sharp or sudden feeling of motion, while other combinations may result in a less-distinct or softer feeling of motion. The type of motion-generating signal, including the quantity, amplitude, range, and relative phases of simultaneous signals generated by the DSP 50 can be varied according to any characteristics or combination of characteristics of the input audio information as discussed above.

In certain embodiments of the invention, the output analog signals may include frequencies and ranges of frequencies selected so as to optimally drive the motion-generating assemblies. Each of the motion-generating assemblies has a frequency range in which it is most responsive to driving frequencies, thereby often resulting in greater sensations of motion for the user of the theater seat 10. Additionally or alternatively, the output analog signals may include frequencies and ranges of frequencies selected so as to minimize any sensation of sound experienced by the user of the theater seat 10 during generation of motion by the motion-generating assemblies. To the extent that these goals can be achieved together, the natural frequencies of the motion-generating assemblies can be chosen or tuned so as to be in frequency ranges minimizing a sensation of sound, generally in the low bass or sub-bass range.

To provide sufficient power to the motion-generating assemblies at these frequency ranges, and as mentioned with respect to FIG. 2, amplifiers 24 are used to amplify the output analog signals. The amplifiers 24 may be any type of suitable low-frequency amplifier, such as commonly-available subwoofer amplifiers. As a non-limiting example, a standard commercially-available subwoofer amplifier such as a Dayton Audio SA240 240-watt subwoofer amplifier may be used for each channel. Once the output analog signals have been sufficiently amplified, they are provided to the motion-generating assemblies so as to generate motion or any other output simulating motion at the various locations of the theater seat 10.

Figure 5:
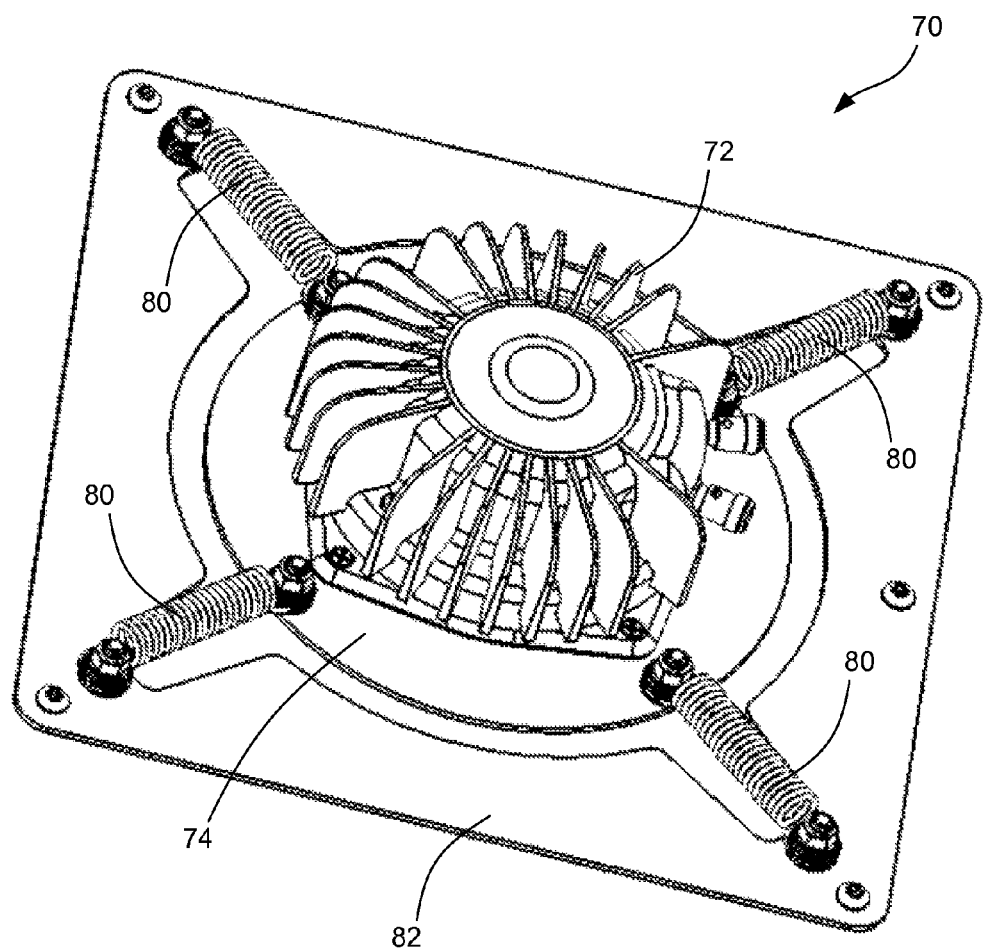
FIG. 5 shows a perspective view of a representative motion-generating assembly.

To aid in understanding how the amplified output analog signals are converted to motion at the theater seat, FIG. 5 shows a perspective view of a representative motion-generating assembly 70. In the view of FIG. 1, the motion-generating assembly 70 of FIG. 5 is the upper back motion assembly 16, but the principles illustrated in FIG. 5 are equally applicable to the lower back motion assembly 14 and the seat motion assembly 12 as well. The motion-generating assembly 70 includes an actuator 72 which converts the amplified output analog signals into motion or any other output simulating motion. The actuator 72 may be any actuator having a desired frequency response and power handling capability, and such actuators are readily commercially available and are sold as "actuators," "shakers," "transducers," and the like. While any of a variety of such devices may be used as the actuator 72, one non-limiting example is an Aura AST-2B-4 pro bass shaker, which is a coiled electrical wire actuator, four-ohm, mass movement actuator having a frequency response of approximately twenty to eighty Hz and a natural frequency of around forty Hz, which is sold at partsexpress-.com. Actuators such as this having primary frequency response characteristics at, near, or below, the low-frequency end of the human-audible frequency spectrum may be deemed "low-frequency actuators," and the motion generated by such actuators may be deemed "low-frequency motion." As is known in the art, the primary motion generated by the actuator 72 under an analog electric signal is axial motion.

In certain embodiments, the actuator 72 itself is essentially the only component forming the motion-generating assembly 70. Such embodiments are easy and inexpensive to manufacture, and are suitable for incorporation into a wide range of seating devices, including home theater seating as well or even movie theater seating. A disadvantage of such embodiments, however, is that motion imparted to the theater seat 10 in such embodiments is commonly transmitted from the actuator 72 directly to the rigid components of the theater seat 10 in such a way that detectable vibrations are transmitted from one theater seat 10 to adjacent and connected theater seats 10. While this is not particularly problematic if all occupants of the theater seats 10 are enjoying similar levels of motion enhancement, it reduces the ability to custom tailor the experience of one theater seat occupant to the next.

For example, in a movie theater setting, the movie theater may wish to obtain a price premium from moviegoers by enabling motion only upon payment of an additional charge by each moviegoer desiring the motion-enhanced experience. If one moviegoer pays for the enhanced experience but adjacent non-paying moviegoers readily obtain some or all of the benefit of the paying moviegoer's experience simply by sitting next to a paying moviegoer, the value of the enhanced experience will be reduced for all moviegoers. Similarly, if another moviegoer dislikes the motion-enhanced experience but is forced to experience at least some motion sensation by sitting next to a customer who wishes to have the motion-enhanced experience, the moviegoer who dislikes the motion-enhanced experience may be dissatisfied with his or her attendance at the movie. For reasons such as these, transmission of motion-sensation vibrations between adjacent theater seats 10 may be undesirable not only in movie theater settings, but in essentially any setting.

Similarly, as discussed above, the signals sent to the seat motion assembly 12, the lower back motion assembly 14, and the upper back motion assembly 16 can differ from each other greatly. Activating different motion-generating assemblies 70 at different times in response to different input audio information as discussed above is intended to cause a person sitting in the theater seat 10 to experience a variety of tactile sensations at a variety of locations of his or her body, thereby enhancing the media-consuming experience in ways differing from what is currently available in the art. In embodiments where the actuators 72 are directly attached to rigid portions of the theater seat 10, the individual motions and vibrations imparted to each of the actuators 72 may be transmitted not only to that specific location of the person's body, but may be transmitted to larger portions of the theater seat 10, including to the entire theater seat 10 through the rigid portions of the theater seat 10. Such transmission of motion through rigid components of the theater seat may muddy or reduce the localized effect of the motion imparted at each of the motion-generating assemblies 70 in ways that can be undesirable.

Figure 6:
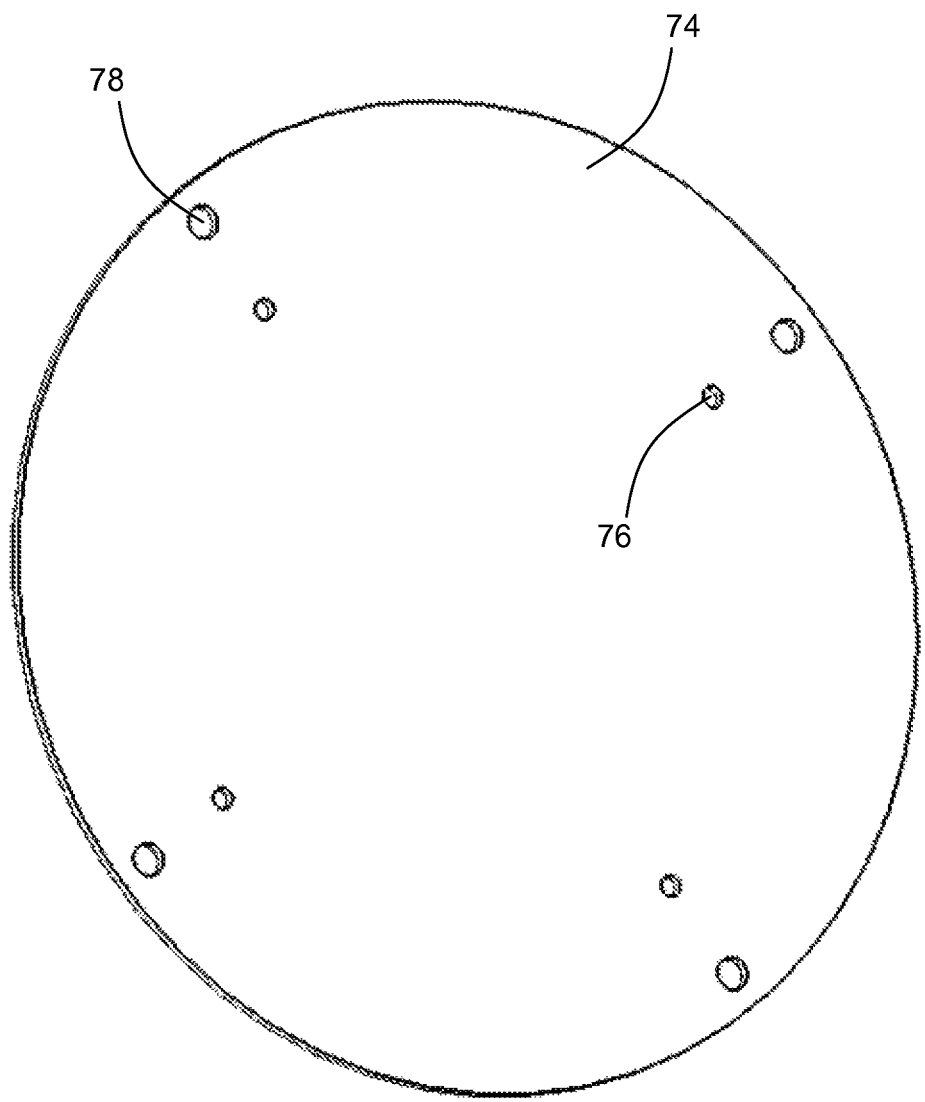
FIG. 6 shows a perspective view of a floating plate from the motion-generating assembly of FIG. 5.

Therefore, some embodiments of the motion-generating assemblies 70 include more than just the actuator 72, or the actuator 72 is not directly connected to the rigid framework and supports of the theater seat 10. Instead, the actuator 72 is mounted to the theater seat 10 by way of a movable and elastically-mounted floating plate 74. The actuator 72 is directly mounted to the floating plate 74. One embodiment of the floating plate 74 is shown in FIG. 6. The floating plate 74 has actuator mounting holes 76 that are used to mount the actuator 72 to the floating plate 74. The floating plate 74 also has spring mounting holes 78 that are used to mount springs 80 to the floating plate 74, as may be seen in FIG. 5 and in FIG. 7.

Figure 7:
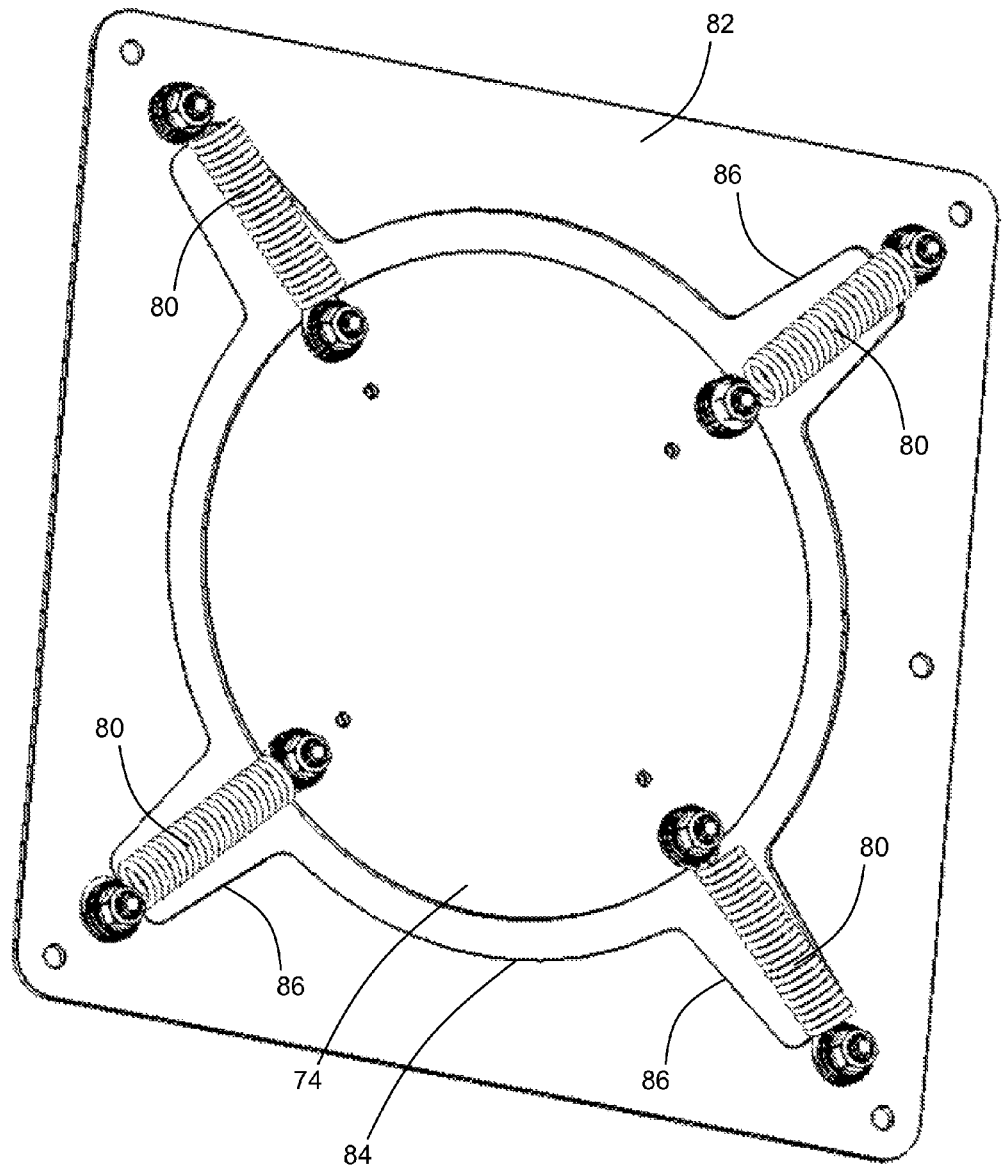
FIG. 7 shows a perspective view of the floating plate of FIG. 6 attached to and suspended from a supporting plate by springs.

The view of FIG. 7 differs from the view of FIG. 5 in that FIG. 7 shows the floating plate 74, springs 80, and a supporting plate 82 without showing the actuator 72. The supporting plate 82 shown in FIGS. 5 and 7 is an element that is configured to be separately mounted to framework elements of the theater seat 10, as may be seen by reference to the upper back motion assembly 16 in the view of FIG. 1; however, it should be understood that the supporting plate 82 may itself form a portion of the framework elements of the theater seat, such as may be seen by reference to the lower back motion assembly 14 in the view of FIG. 1, with essentially no change in function.

The springs 80 are mounted to and extend between the floating plate 74 and the supporting plate 82. The springs 80 may be mounted to the floating plate 74 and the supporting plate 82 using any known fasteners or may be secured to the floating plate 74 and the supporting plate 82 using loops in the springs 80, such as by passing through the spring mounting holes 78. Essentially any means for securely connecting the springs 80 to the floating plate 74 and to the supporting plate 82 may be used so long as the vibrations or other movement of the actuator 72 do not cause the springs 80 to become dislodged. The springs 80 themselves may be made of any material known in the art to be suitable for springs that will perform the functions discussed herein and have a sufficiently long life. When the springs 80 are mounted between the floating plate 74 and the supporting plate 82, they are mounted under an initial pulling tension such that serves to bias the floating plate 74 to an initial position as shown in FIGS. 5 and 7.

While the springs 80 are shown in FIGS. 5 and 7, some embodiments of the invention may utilize other elastic or visco-elastic elements in place of the springs 80. Such elements may be made, for example from natural or synthetic rubber materials and the like. The purpose of the springs 80 or similar elastic or visco-elastic elements is to provide isolation between any movement imparted to the actuator 72 and the floating plate 74 and the supporting plate 82 and any other frame elements of the theater seat 10 such that the transmission of motion and motion sensations from one part of the theater seat 10 to other parts of the theater seat 10 and from one theater seat 10 to the next theater seat 10 are minimized.

To permit relatively-free movement between the combination of the actuator 72 and the floating plate 74 relative to the supporting plate 82, the supporting plate 82 is provided with a primary opening 84. The primary opening 84 is sized to be somewhat larger than the size of the floating plate 74, such that any non-axial motion of the actuator 72 and the floating plate 74 does not cause direct contact between the floating plate 74 and the supporting plate 82 that could impinge the motion of the floating plate 74 and the actuator 72. Additionally, to further facilitate free motion, and specifically axial motion of the floating plate 74 and the actuator 72 relative to the supporting plate 82, the primary opening 84 is provided with opening arms 86 corresponding to the locations of the springs 80 such that as primarily-axial motion is imparted by the actuator 72 to the combination of the actuator 72 and the floating plate 74, this motion is not reduced by a portion of the springs 80 contacting the edges of the primary opening 84.

Figure 8:
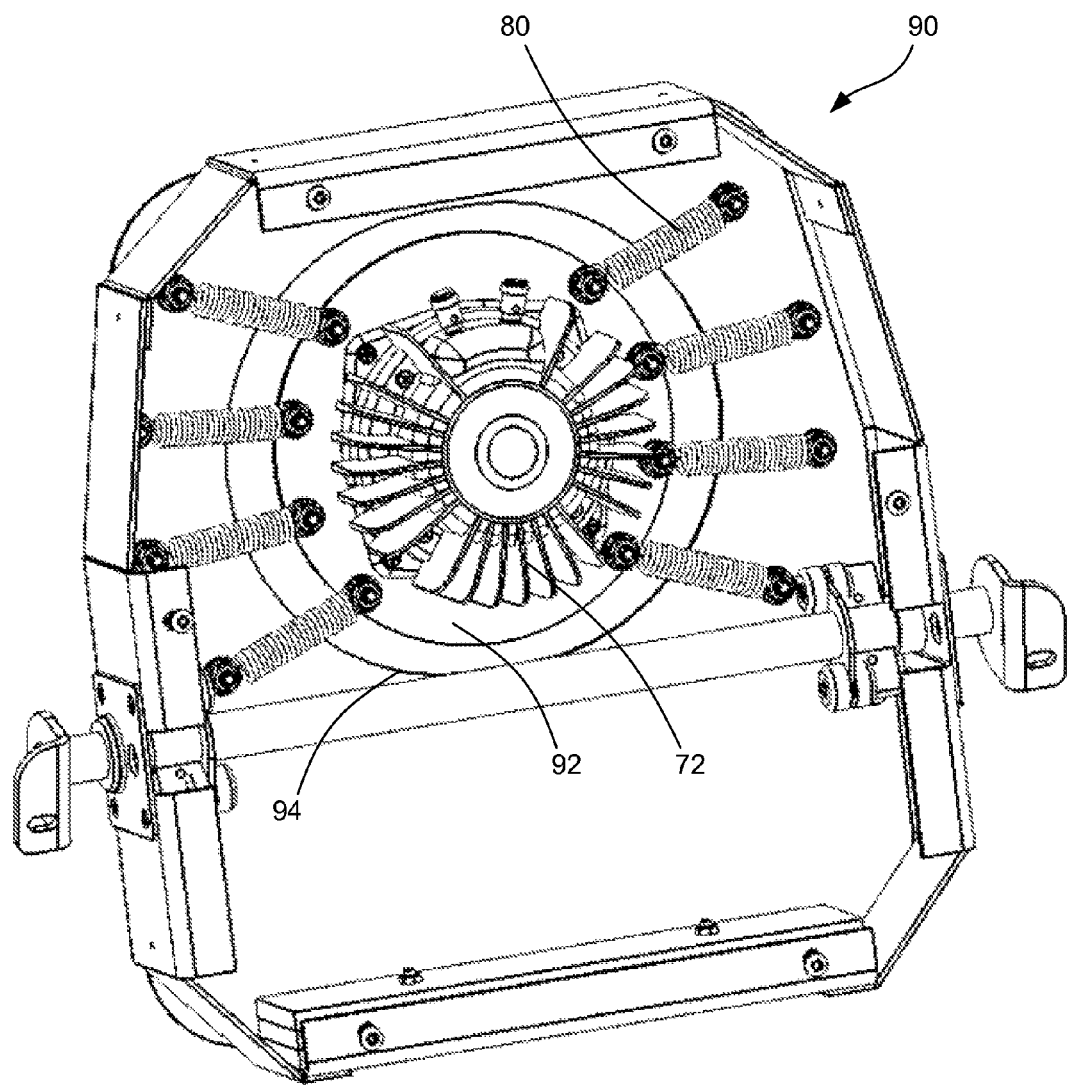
FIG. 8 shows a perspective view of a representative motion-generating assembly suitable for use in a seat portion of a theater seat.

While FIGS. 5-7 show an embodiment of the motion-generating assembly 70 that may be used for or is at least illustrative of principles applicable to the seat motion assembly 12, the lower back motion assembly 14, and the upper back motion assembly 16, FIG. 8 shows an alternative motion-generating assembly 90 that may optionally be used specifically for some embodiments of the seat motion assembly 12. Several differences may be noted between the motion-generating assembly 90 of FIG. 8 and the motion-generating assembly 70 of FIG. 5. Specifically, the motion-generating assembly 90 of FIG. 8 utilizes eight springs 80 instead of just four springs 80, and a floating plate 92 of the motion-generating assembly 90 is modified accordingly to accept attachment of the additional springs 80. Additionally, a primary opening 94 of the motion-generating assembly 90 is modified in that it lacks opening arms corresponding to the locations of the springs 80. One aspect that remains unchanged is that the actuator 72 is identical to the actuator 72 of the motion-generating assembly 70.

Initially, the lack of the opening arms would appear to be a potential source of reduced motion of the actuator 72 and floating plate 92 relative to the surrounding structure. However, it should be noted that in each of the various motion-generating assemblies, the actuator 72 is mounted so as to be located on a side of the respective floating plates that is away from the body-supporting surfaces of the theater seat 10, as may be seen by reference to FIG. 1. Thus, when a user of the theater seat 10 sits down, his or her weight presses downward through any padding of the seat portion of the theater seat 10 causing downward pressure (out of the page of FIG. 8) on the floating plate 92. This downward pressure causes a bias in the position of the floating plate 92 and the attached actuator 72, causing an initial separation between the springs 80 and the surrounding structure such that impingement between the springs 80 and the surrounding structure does not occur as motion is imparted by the actuator 72 to the combination of the actuator 72 and the floating plate 92.

Figure 9:
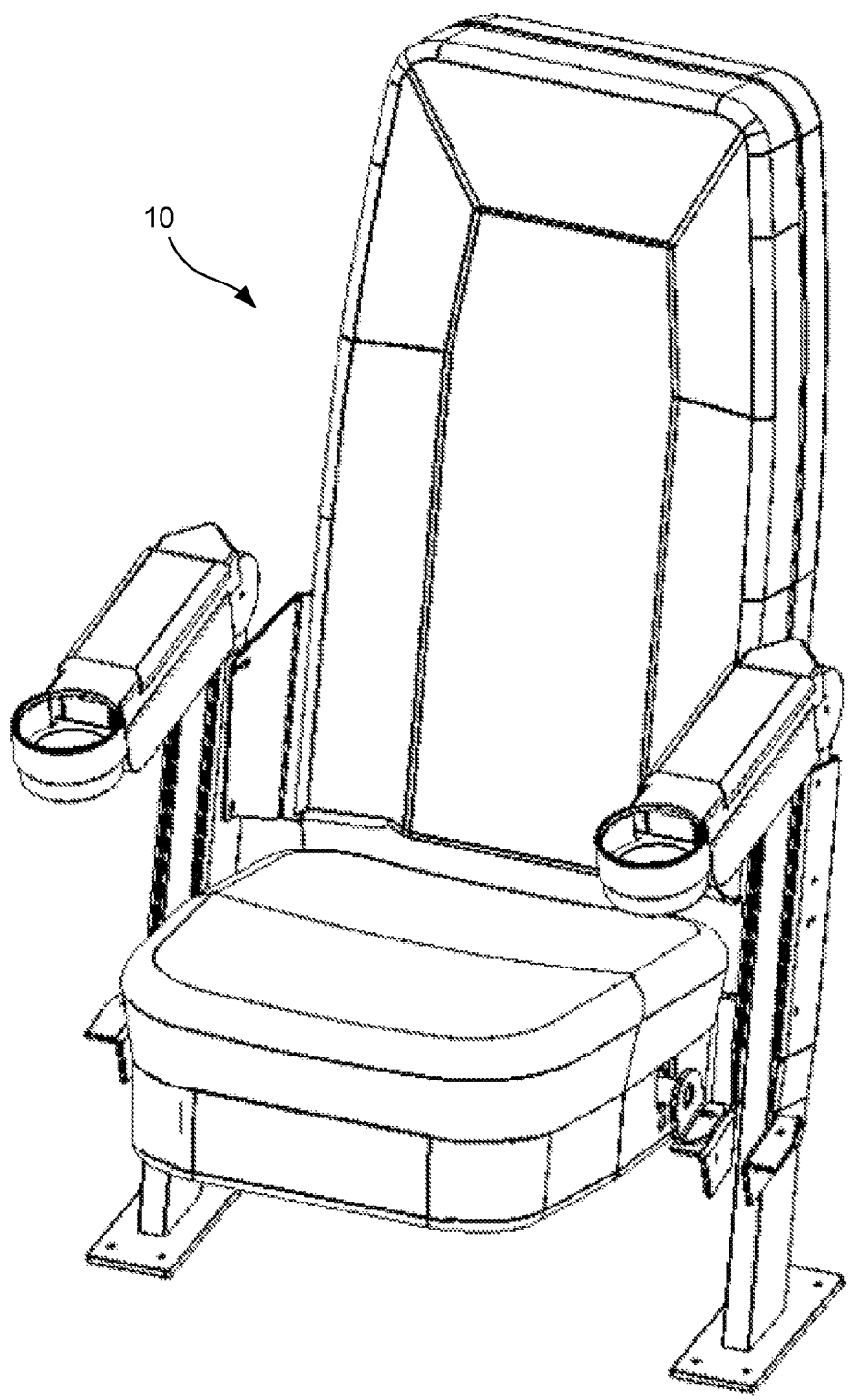
FIG. 9 shows a perspective view of the representative theater seat of FIG. 1 including padding and upholstery.

As will be readily appreciated, the materials of the components of the motion-generating assemblies 70 and of the motion-generating assemblies 90 may be selected from a variety of suitable materials providing suitable physical properties. For example, some components may be made of well-known metals, plastics and/or composites providing adequate structural features to support the user's weight as well as support for the motion-enhanced functions described herein. As is illustrated in FIG. 9, which shows a perspective view of a finished, padded, and upholstered version of the theater seat 10, many of the elements shown in FIGS. 5-8 will be hidden within the theater seat 10 by the finish elements of the theater seat 10, such that the theater seat 10 may adequately resemble a standard, non-motion-enhanced theater seat.

The user of the theater seat 10 feels that motion-enhanced experience provided by the various independent motion-generating assemblies through the padding and upholstery of the theater seat 10. Because of the spring-based suspension of the various motion-generating assemblies and because of the natural motion-dampening effects of the padding and upholstery, the motion effects generated at any one of the motion-generated assemblies is localized to areas of the user's body in moderately close proximity to that motion-generated assembly.

While some embodiments of the invention have been discussed with respect to theater seating and home theater seating, embodiments of the invention are not limited to such applications. Embodiments of the invention may be utilized with essentially any kind of seating where motion enhancement may be provided in conjunction with delivery of any media type having an audio component. Therefore, embodiments of the invention may be utilized in automotive settings as well as essentially any stationary or mobile type of seating.

Additionally, while some embodiments of the invention rely on audio information contained in pre-recorded media types, alternative embodiments of the invention may be used to provide varied and localized tactile sensations to users of seating in response to audio information detected, for example, by a microphone adjacent to or remote from the seating. Such embodiments may be utilized, for example, by people with hearing problems to provide varied tactile information corresponding to and as a kind of translation of detected sound events not audible to the people with hearing problems. In such embodiments the signal processor module 22 may be programmed to provide analog output signals in response to quite different input audio information than in the other examples described above.

The foregoing examples are merely examples of potential areas of applicability of certain embodiments of the invention, and other areas of applicability will be understood by way of practicing the embodiments of the invention.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A system for providing a motion-enhanced experience to consumption of media containing audio information, the system comprising:
    a seat having a plurality of motion-generating assemblies incorporated therein at different locations of the seat; and
    a signal processor module communicatively connected to the motion-generating assemblies, the signal processor module being configured to receive audio information from an audio source and to process the audio information into a plurality of output signals, each output signal comprising primarily low-frequency signal information generated by the signal processor module to drive one of motion and output simulating motion, and each output signal being simultaneously directed to one of the motion-generating assemblies, the output signals differing from the audio information received from the audio source;
    wherein the signal processor module comprises a digital signal processor that is configured to devalue or suppress audio information carried on an input channel carrying a majority of dialog contained in the audio information from the audio source to minimize or eliminate motion at the motion-generating assemblies caused by dialog.

2. A system as recited in claim 1, wherein the digital signal processor analyzes the audio information from the audio source and generates each of the output signals based on aspects of the audio information contained in different frequency ranges of the audio information from the audio source.

3. A system as recited in claim 2, wherein the system comprises three motion-generating assemblies and wherein:
    a first motion-generating assembly receives a first output signal corresponding to lower-frequency aspects of the audio information from the audio source;
    a second motion-generating assembly receives a second output signal corresponding to mid-frequency aspects of the audio information from the audio source; and
    a third motion-generating assembly receives a third output signal corresponding to higher-frequency aspects of the audio information from the audio source.

4. A system as recited in claim 3, wherein the first output signal, the second output signal, and the third output signal comprise one of:
    signals corresponding at least partially to overlapping ranges of sounds in the audio information; and
    signals corresponding to dynamically changing ranges of sounds in the audio information.

5. A system as recited in claim 2, wherein the aspects of the audio information from the audio source that serve as a basis for the digital signal processor to generate the output signals comprise one of:
    an average power of certain frequencies or a given frequency range;
    a frequency signature of certain frequencies or a given frequency range;
    a dynamic threshold spectral power of certain frequencies or a given frequency range;
    power of certain frequencies or a given frequency range relative to power of the certain frequencies or the given frequency range at previous times;
    power of certain frequencies or a given frequency range relative to power of other frequencies or other frequency ranges;
    a time period of an audio event at certain frequencies or within a given frequency range;
    rates of attack at certain frequencies or frequency ranges;
    rates of volume change at certain frequencies or frequency ranges;
    narrowness or breadth of frequencies present in certain frequency ranges;
    volume at certain frequencies or frequency ranges;
    change in volume at certain frequencies or frequency ranges; and
    comparisons in volume between differing frequencies or frequency ranges;
    similarities between the audio information from the audio source and stored audio information from a stored audio source.

6. A system as recited in claim 5, wherein the output signals comprise periods of activity and periods of inactivity generated by the digital signal processor based on one or more aspects of the audio information from the audio source recited in claim 4.

7. A system as recited in claim 1, wherein each of the output signals comprises a frequency spectrum optimally tuned to drive the motion-generating assemblies.

8. A system as recited in claim 1, wherein each of the motion-generating assemblies comprises a low-frequency actuator.

9. A system as recited in claim 1, wherein none of the output signals comprise audio signals drawn from the audio information from the audio source.

10. A system as recited in claim 1, further comprising a plurality of amplifiers connected between the signal processor module and the motion-generating assemblies, each amplifier receiving and amplifying one of the output signals and passing the amplified analog signal to one of the motion-generating assemblies.

11. A system as recited in claim 1, wherein the system comprises three motion-generating assemblies: a first motion-generating assembly being located in a seat portion of the seat, a second motion-generating assembly being located in a lower back portion of the seat, and a third motion-generating assembly being located in an upper back portion of the seat.

12. A system as recited in claim 1, wherein the output simulating motion is generated by the motion-generating assemblies and comprises one of:
   tactile output;
   electrical stimulation; and
   temperature changes.

13. A system as recited in claim 1, wherein the system further comprises an input device configured to permit a user of the seat to modify an experience created by the motion-generating assemblies via one of a wired connection and a wireless connection during use of the seat.

14. A system as recited in claim 1, wherein the signal processor module comprises a library of outputs to be directed to the motion-generating assemblies based on specific sets of inputs received from the audio source.

15. A system as recited in claim 1, wherein the signal processor module is configured to modify input frequency and amplitude ranges and output frequency and amplitude ranges for each motion-generating assembly dynamically.

16. A system as recited in claim 1, further comprising one of a feedback look and a feed forward loop as an input to the signal processor module with at least one control of frequency range and amplitude selected from the group of:
   a gain function;
   a derivative function; and
   an integral function.

17. A system for providing a motion-enhanced experience to consumption of media containing audio information, the system comprising:
   a seat having a plurality of motion-generating assemblies incorporated therein at different locations of the seat, each motion-generating assembly comprising a low-frequency actuator mounted to a floating plate suspended from a comparatively rigid component of the seat by one or more elastic or visco-elastic elements; and
   a signal processor module communicatively connected to the motion-generating assemblies, the signal processor module being configured to receive audio information from an audio source and to process the audio information into a plurality of output signals, each output signal comprising primarily low-frequency signal information generated by the signal processor module to drive one of motion and output simulating motion, and each output signal being simultaneously directed to one of the motion-generating assemblies, the output signals differing from the audio information received from the audio source.

18. A system as recited in claim 17, wherein the digital signal processor is configured to devalue or suppress audio information carried on an input channel carrying a majority of dialog contained in the audio information from the audio source to minimize or eliminate motion at the motion-generating assemblies caused by dialog.

19. A system for providing a motion-enhanced experience to consumption of media containing audio information, the system comprising:
   a seat having a plurality of motion-generating assemblies incorporated therein at different locations of the seat, each motion-generating assembly comprising a low-frequency actuator mounted to a floating plate suspended from a comparatively rigid portion of the seat by springs; and
   a signal processor module communicatively connected to the motion-generating assemblies, the signal processor module being configured to receive audio information from an audio source and to process the audio information into a plurality of output signals, each output signal comprising primarily low-frequency signal information generated by the signal processor module to drive one of motion and output simulating motion, and each output signal being simultaneously directed to one of the motion-generating assemblies, the output signals differing from the audio information received from the audio source.

20. A motion-enhanced theater seat system comprising:
   a theater seat comprising a seat portion and a back and further comprising:
      a first motion-generation assembly located in the seat portion;
      a second motion-generation assembly located in a lower portion of the back; and
      a third motion-generation assembly located in an upper portion of the back;
   three amplifiers connected to the motion-generation assemblies to provide amplified signals to drive the motion-generation assemblies; and
   a signal processor module communicatively connected to the amplifiers and providing independent output signals to each of the amplifiers, the signal processor being configured to receive audio information, to analyze differing frequency ranges of the audio information, and to generate the independent output signals based on characteristics of the audio information such that each of the independent output signals is based on characteristics of a different frequency range of the audio information than either of the other independent output signals;
   wherein:
      the first motion-generating assembly receives a first output signal corresponding to lower-frequency aspects of the audio information;
      the second motion-generating assembly receives a second output signal corresponding to mid-frequency aspects of the audio information; and
      the third motion-generating assembly receives a third output signal corresponding to higher-frequency aspects of the audio information.

21. A system as recited in claim 20, wherein the signal processor module comprises a digital signal processor that analyzes the audio information from the audio source and generates each of the output signals.

22. A motion-enhanced theater seat system comprising:
   a theater seat comprising a seat portion and a back and further comprising:
      a first motion-generation assembly located in the seat portion;
      a second motion-generation assembly located in a lower portion of the back; and
      a third motion-generation assembly located in an upper portion of the back;
   three amplifiers connected to the motion-generation assemblies to provide amplified signals to drive the motion-generation assemblies; and
   a signal processor module communicatively connected to the amplifiers and providing independent output signals to each of the amplifiers, the signal processor being configured to receive audio information, to analyze differing frequency ranges of the audio information, and to generate the independent output signals based on characteristics of the audio information such that each of the independent output signals is based on characteristics of a different frequency range of the audio information than either of the other independent output signals, wherein the characteristics of the audio information that serve as a basis for the signal processor module to generate the independent output signals comprise information selected from the group consisting of:
- an average power of certain frequencies or a given frequency range;
- a frequency signature of certain frequencies or a given frequency range;
- a dynamic threshold spectral power of certain frequencies or a given frequency range;
- power of certain frequencies or a given frequency range relative to power of the certain frequencies or the given frequency range at previous times;
- power of certain frequencies or a given frequency range relative to power of other frequencies or other frequency ranges;
- a time period of an audio event at certain frequencies or within a given frequency range;
- rates of attack at certain frequencies or frequency ranges;
- rates of volume change at certain frequencies or frequency ranges;
- narrowness or breadth of frequencies present in certain frequency ranges;
- volume at certain frequencies or frequency ranges;
- change in volume at certain frequencies or frequency ranges; and
- comparisons in volume between differing frequencies or frequency ranges;
- similarities between the audio information from the audio source and stored audio information from a stored audio source.

23. A method for receiving audio information and automatically generating a plurality of low-frequency output signals derived from and differing from the received audio information, the output signals being configured to drive motion at a plurality of actuators, the method comprising:
   receiving audio information containing a first range of frequencies;
   analyzing a second range of frequencies of the audio information to determine one or more aspects of the audio information within the second range of frequencies, the second range of frequencies being a portion of the first range of frequencies smaller than the first range of frequencies;
   analyzing a third range of frequencies of the audio information to determine one or more aspects of the audio information within the third range of frequencies, the third range of frequencies being a portion of the first range of frequencies smaller than the first range of frequencies and differing from the second range of frequencies;
   utilizing the one or more aspects of the audio information within the second range of frequencies to generate a low-frequency first output signal that differs from the audio information; and
   utilizing the one or more aspects of the audio information within the third range of frequencies to generate a low-frequency second output signal that differs from the first output signal and from the audio information.

24. A method as recited in claim 23, wherein at least one of the second range of frequencies and the third range of frequencies includes frequencies substantially higher than any frequencies contained in the first and second output signals.

25. A method as recited in claim 23, wherein the one or more aspects of the audio information comprise one of:
   an average power of certain frequencies or a given frequency range;
   a frequency signature of certain frequencies or a given frequency range;
   a dynamic threshold spectral power of certain frequencies or a given frequency range;
   power of certain frequencies or a given frequency range relative to power of the certain frequencies or the given frequency range at previous times;
   power of certain frequencies or a given frequency range relative to power of other frequencies or other frequency ranges;
   a time period of an audio event at certain frequencies or within a given frequency range;
   rates of attack at certain frequencies or frequency ranges;
   rates of volume change at certain frequencies or frequency ranges;
   narrowness or breadth of frequencies present in certain frequency ranges;
   volume at certain frequencies or frequency ranges;
   change in volume at certain frequencies or frequency ranges; and
   comparisons in volume between differing frequencies or frequency ranges;
   similarities between the audio information from the audio source and stored audio information from a stored audio source.

* * * * *